Feb. 8, 1966     E. B. FERNBERG     3,233,502
RESILIENT FASTENER WITH HOLLOW SHANK
Filed April 22, 1963     2 Sheets-Sheet 1

Inventor
ERIC B. FERNBERG.
by Walter J. Jones,
Attorney.

Feb. 8, 1966 E. B. FERNBERG 3,233,502
RESILIENT FASTENER WITH HOLLOW SHANK
Filed April 22, 1963 2 Sheets-Sheet 2

Inventor
ERIC B. FERNBERG,
by Walter J. Jones,
Attorney.

United States Patent Office 3,233,502
Patented Feb. 8, 1966

3,233,502
RESILIENT FASTENER WITH HOLLOW SHANK
Eric Birger Fernberg, Wavendon, near Bletchley, England, assignor to United-Carr Incorporated, a corporation of Delaware
Filed Apr. 22, 1963, Ser. No. 274,770
Claims priority, application Great Britain, Apr. 24, 1962, 15,615/62
1 Claim. (Cl. 85—80)

The present invention relates to a fastener which is particularly although not exclusively suitable for securing two apertured members together.

According to the invention there is provided a one piece fastener made of a resilient mouldable material such as synthetic plastics material, comprising a head and a stud which is formed with a longitudinal stopped bore closed at or near the head and has an open nose formed with slots which extend longitudinally of the nose.

Figures 1, 2:
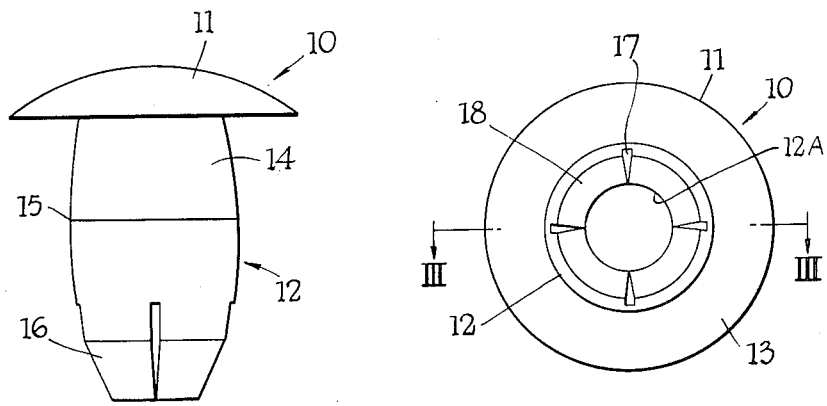
Figures 3, 4:
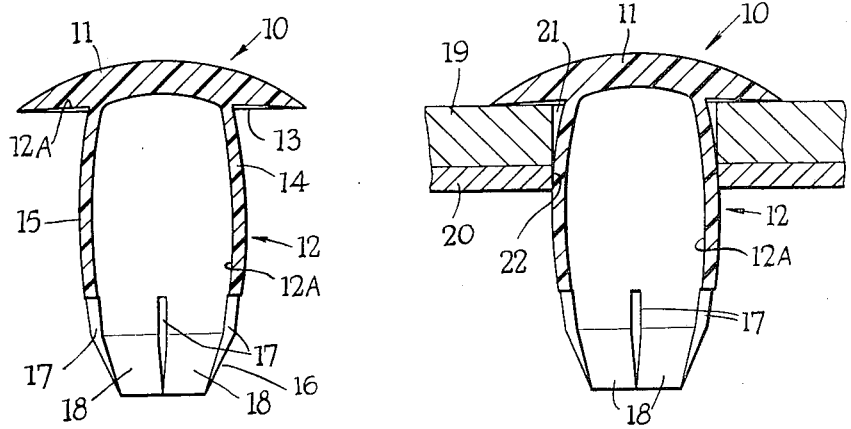
Figure 5:
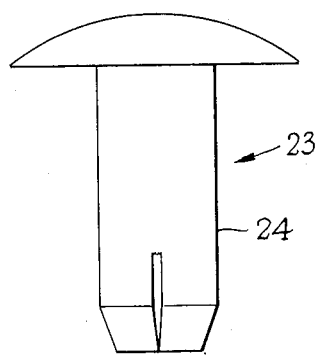
Figure 6:
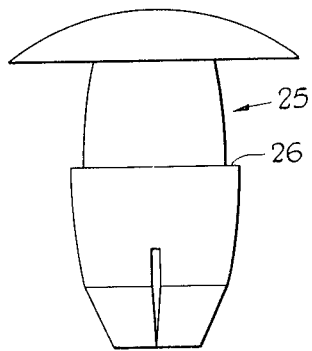
Figure 7:
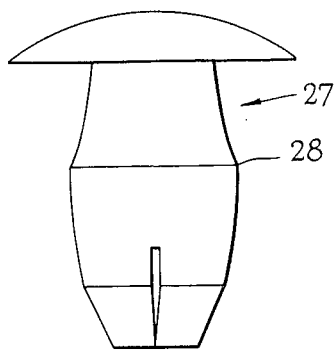

Preferred forms of the invention will now be described with reference to the accompanying diagrammatic drawings in which:

FIGURE 1 is an elevation of a fastener,
FIGURE 2 is an under-plan of the fastener of FIGURE 1,
FIGURE 3 is a section on the line III—III of FIGURE 2,
FIGURE 4 is a sectional elevation showing the fastener of FIGURES 1 to 3 securing a trim pad to an apertured panel, and
FIGURES 5, 6 and 7 are elevations illustrating three further modifications of the invention.

The fastener indicated generally at 10 in FIGURES 1 to 4 is formed from any suitable mouldable material which is resilient in its finished state, such as a synthetic plastic, and comprises a head 11 from which extends a stud indicated generally at 12.

The head 11 is in the shape of a segment of a sphere with a concavely dished undersurface 13.

The stud 12 is formed with a longitudinal bore 12A which is stopped at the head end. Externally the stud is approximately barrel shaped, having a neck 14 which increases in diameter up to a point 15 of maximum diameter and an open nose 16 of decreasing diameter.

Externally the nose is in the form of a split frustum of a cone.

The wall of the nose 16 of the stud is divided longitudinally by four angularly equidistant slots 17 thus forming four tongues 18 which are resilient and allow the nose to be compressed radially inwardly with respect to the longitudinal axis of the stud. For this purpose the slots stop short of the point 15 of maximum diameter.

The fastener 10 is particularly, athough not exclusively, suitable for use in the car industry for securing a trim pad to the metal panel of a car body.

In FIGURE 4 the fastener 10 is shown as it functions to secure a trim pad 19 to a metal panel 20.

The trim pad and the panel are each formed with a plurality of apertures such as those shown at 21 and 22 respectively, all of approximately the same diameter.

In order to secure the trim pad to the panel the pad is brought up to the panel and adjusted until each aperture 21 in the trim pad is at least approximately co-axial with an aperture 22 in the panel, whereupon a fastener is forced into each pair of aligned apertures.

The fastener 10 may be inserted into the apertures in the same way as a conventional nail merely by striking the head 11 with a hammer, the slotted nose 16 providing a good lead-in and ensuring that the fastener does not readily cant when struck.

In the region of the point 15 the stud is of greater diameter than the apertures 21 and 22, and as it will not compress easily, owing to its tubular structure, considerable force has to be applied either to insert or withdraw the fastener.

When the fastener has been struck home the dished under-surface 13 of the head 11 tends to flatten against the trim pad 19 and, acting as a spring, operates with the outwardly sloping surface of the neck 14 of the stud to pull the pad and panel together whilst ensuring a watertight sealing of the apertures 21 and 22.

The fastener 23 shown in FIGURE 5 is similar to that of FIGURES 1 to 4, except that the stud 24 is externally cylindrical.

The fastener 25 of FIGURE 6 is formed externally with a discontinuity in the form of a shoulder 26 the concave side of which is towards the head.

As shown in FIGURE 7 the fastener 27 has a shoulder 28 formed by inverting the curvature of the stud at the point of maximum diameter.

The head of any one of the fasteners described above may be modified in a variety of ways. For example it may be rectangular or oval in plan view. Alternatively, or in addition, it may be adapted to secure a member such as a cable or beading to an apertured panel in place of the trim pad 19 shown in FIGURE 4.

It will be seen that such a fastener provides simple means for securing two members together. It functions in the manner of a conventional nail, but being formed from a resilient mouldable material it ensures a watertight seal of the apertures and will not set up corrosion in a metal panel.

What I claim is:

A molded resilient fastening device adapted for frictionally engaging the internal walls defined by axially aligned apertures of a plurality of overlapping panels, comprising an enlarged head section having a dished face for sealingly engaging a surface of a panel, and a wall of substantially uniform thickness defining an elongated tubular shank extending from said dished face of said head section to an open end termination remote from said head, said shank being hollow from said head section to said open end, the portion of said shank adjacent said head being longitudinally concave and having an external surface defining a comparatively small diameter adjacent said head and increasing to a larger diameter intermediate said shank joined at said larger diameter by a convexly curved shank portion which decreases to a small diameter and terminates in a tapered portion.

References Cited by the Examiner
UNITED STATES PATENTS

| 1,936,113 | 11/1933 | Jelliffe. |
| 2,851,078 | 9/1958 | Mellon et al. |
| 2,853,913 | 9/1958 | Rapata _____ 85—5 |
| 3,029,486 | 4/1962 | Raymond. |

FOREIGN PATENTS

| 1,111,742 | 11/1955 | France. |

EDWARD C. ALLEN, *Primary Examiner.*